INVENTOR
GEOFFREY B. PARKINSON
BY Elmer J. Gorn
ATTORNEY

Jan. 24, 1961

G. B. PARKINSON 2,969,458

ANTI-IMAGE SYSTEMS

Filed May 27, 1957

2 Sheets-Sheet 2

INVENTOR
GEOFFREY B. PARKINSON
BY Elmer J. Gorn
ATTORNEY 2,969,458

ANTI-IMAGE SYSTEMS

Geoffrey B. Parkinson, Waltham, Mass., assignor to Raytheon Company, a corporation of Delaware Filed May 27, 1957, Ser. No. 661,704

3 Claims. (Cl. 250—20)

This invention relates to an anti-image system suitable for use in a radar receiver, and more particularly, to an anti-image system that works in conjunction with an automatic frequency control system for preventing a false lock of the local oscillator on the incorrect or image frequency instead of the correct frequency.

Automatic frequency control systems have been commonly used in radar receivers in order to maintain a fixed frequency, henceforth called the "intermediate-frequency," between the local oscillator and the carrier frequency. Heretofore, if reception of the carrier signal were lost for any reason, the intermediate-frequency would correspondingly be lost thereby causing an automatic frequency control circuit, commonly called AFC to vary the local oscillator until the carrier signal was again detected and a new intermediate-frequency signal produced. It would therefore be a matter of chance as to whether the local oscillator in sweeping the frequency spectrum would lock on the undesired image frequency, which is below the carrier frequency, or whether the local oscillator would lock on the desired frequency, which has arbitrarily been chosen as the frequency higher than the carrier frequency. Various attempts have been made to solve this problem which include sweeping the local oscillator from the carrier frequency through a higher frequency that would produce only the desired intermediate-frequency. These aforementioned systems, under normal operating conditions, will produce the desired intermediate-frequency except that, if perchance the local oscillator should produce a signal lower in frequency than the carrier signal, there will be produced an intermediate-frequency at the lower or image frequency. If the intermediate-frequency is the image frequency, the system will never know it and lock on this incorrect frequency will be maintained to the detriment of the overall system. In practice these conditions do occur at a surprisingly high rate and have been found to be caused by such things as low operating potential, poor voltage regulation, transient conditions, spurious echoes and random noise. If these conditions occur at the critical time when the local oscillator is sweeping, it is possible for lock to occur at the image frequency. The net result of these random signals is that lock does take place, and the system does not know it has locked on the incorrect frequency. This defect is all the more serious, not simply because lock has taken place on the image frequency, but rather because the system has been fooled into thinking it is on the correct and desired frequency and hence will never recycle or cause the local oscillator to change.

The present invention is concerned with an anti-image circuit that works in conjunction with an AFC system that sweeps the frequency spectrum of the local oscillator if the intermediate-frequency is lost for any reason. In sweeping the anti-image circuit prevents the local oscillator from locking on the undesired image frequency in such a manner that it is impossible to fool the system and cause a lock except on the true or desired local oscillator frequency. The problem, therefore, is not only to make the system lock on the desired intermediate-frequency and also prevent locking on the image frequency, but also to enable the system in such a manner that lock on the image frequency is an impossibility regardless of the cause, be it from low operating potential, or spurious incoming pulses.

In this invention, false lock is prevented by having, in addition to the normal AFC loop that maintains the frequency of the local oscillator, an additional element such as a filter or discriminator tuned to a lower frequency than the desired intermediate-frequency that will automatically emit a recycling signal to the local oscillator should lock occur at or near the image frequency. For example, if the intermediate-frequency is 60 megacycles, the filter or discriminator would be tuned to approximately 55 megacycles, the output of said filter being fed through a suitable unidirectional device that would allow only defined pulses which in this case are negative pulses to pass through. These negative pulses are arranged to cause a recycle or sweep of the local oscillator. As will be explained later, the negative pulse output from the defined filter or discriminator would indicate an incorrect intermediate-frequency of the local oscillator.

Further objects and advantages of this invention will be made more apparent as the description progresses. Reference now being made to the accompanying drawings wherein.

Figure 1:
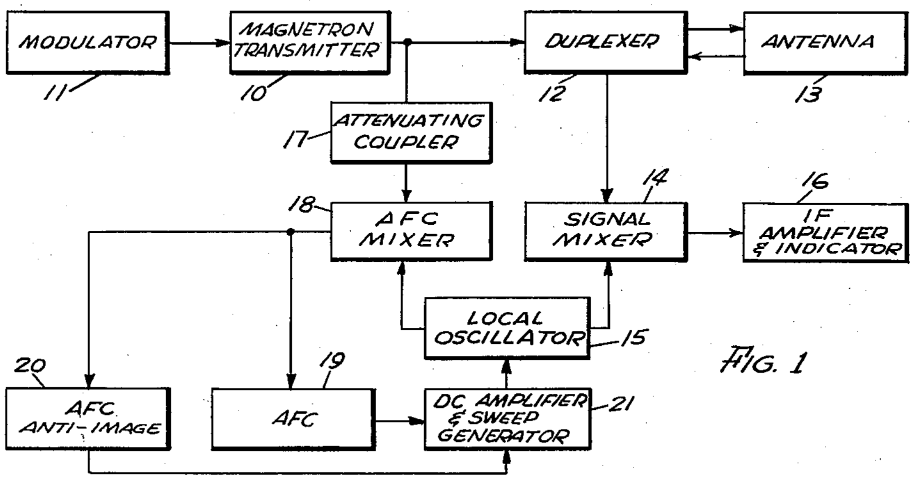
Fig. 1 is a block diagram of a radar system.

Referring now to Fig. 1, there is shown a block diagram of a complete radar system. The radar system is conventional in that the carrier frequency is determined by a magnetron transmitter 10 that is keyed on and off at a rate that is determined by a modulator 11. The microwave energy transmitted by magnetron transmitter 10 is fed to a duplexer 12, which, in turn, is connected to antenna 13. Duplexer 12 serves the dual purpose of feeding the maximum transmitted energy directly to antenna 13 and also to channel the relatively weak reflected echo received by antenna 13 to the receiving portion of the radar system. The received reflected energy fed from antenna 13 to duplexer 12 is channeled from duplexer 12 to a signal mixing stage 14 where the received signal is heterodyned with the output of a local oscillator 15. The output of the signal mixer 14 is the fixed or intermediate-frequency that is fed to a signal IF amplifier and indicator stage 16. Since this invention is concerned only with the generation and control of the proper output frequency of local oscillator 15, the indicating means and associated circuits for presenting the reflected echo will not be further illustrated except as reference 16. As in any superheterodyne type receiver, tuning of the receiver is accomplished by sweeping the local oscillator 15 through a range of frequencies until the output of the local oscillator heterodynes with the received signal to produce the desired intermediate-frequency signal. In this case, the intermediate-frequency has been arbitrarily chosen as that frequency that is produced when the local oscillator is higher in frequency than the frequency of the magnetron transmitter 10. The system to be described for causing the local oscillator to lock on the proper frequency is equally applicable regardless of where lock is desired.

Automatic frequency control circuits, as mentioned previously, are employed in radar receivers to maintain the difference frequency between the local oscillator and the transmitter at a constant value. The problem of obtaining proper AFC action is made more difficult since there are usually two oscillator frequencies that can be produced, one higher and one lower than the carrier frequency, that will produce a proper intermediate-frequency, and hence, it is possible, therefore, for an AFC system to lock on either of these frequencies. For systems having the oscillator frequency tuned to the high side of the magnetron oscillator, improper operation would occur if lock occurs on the low side. The AFC system described in this invention tunes and maintains the tuning of the receiver by developing a tuning voltage by sampling a low amplitude signal from transmitter 10 by means of an attenuating coupler 17. This sample portion of the carrier output frequency is fed to an AFC mixer 18 which also receives a sampling of the local oscillator signal generated by local oscillator 15. Since the tuning of local oscillator 15 determines the receiver tuning, the AFC mixer 18 therefore compares the transmitted frequency with the local oscillator frequency to develop a voltage used to control the local oscillator frequency. The output of AFC mixer 18 is a signal having a frequency indicative of the difference between the transmitter and local oscillator signals. This signal from AFC mixer 18 is connected to both a normal AFC control circuit 19 and an AFC anti-image circuit 20. The output from the normal AFC circuit 19 is fed to a D.C. amplifier and generator sweep circuit 21, the output of which is connected to local oscillator 15 for maintaining the frequency of local oscillator 15. The sweep portion of D.C. amplifier and generator circuit 21 causes local oscillator 15 to sweep in frequency in order to locate the received signal. The output of AFC anti-image circuit 20 is also connected to D.C. amplifier and sweep generator 21, not for the purpose of maintaining the frequency of local oscillator 15, as is the purpose of AFC circuit 19, but for the purpose of causing a recycling of the sweep generator sweep in reference 21 depending on whether lock takes place at the image or desired local oscillator frequency.

Figure 2:
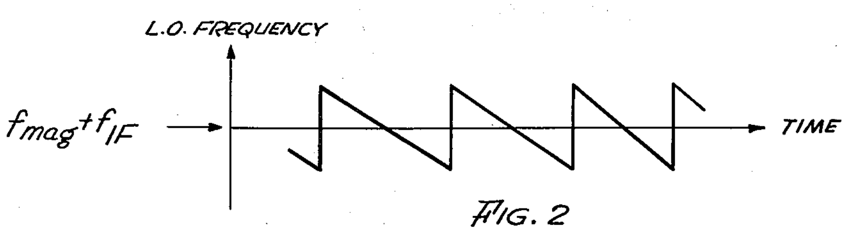
Fig. 2 illustrates a sawtooth voltage for controlling the sweep or search of the local oscillator.
Figure 3:
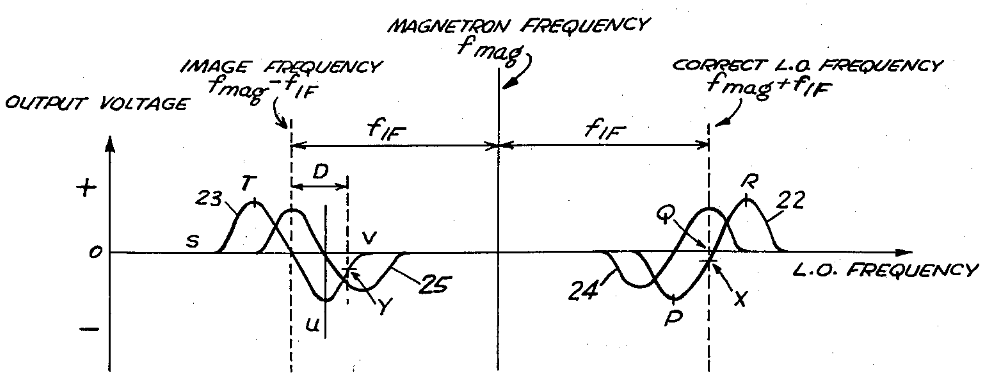
Fig. 3 illustrates the output curves or voltage signals from a normal AFC system, and also from the anti-image AFC system illustrated in Fig. 1.

Referring now to Fig. 3, there is shown a graph illustrating how the sweeping of local oscillator 15 about the magnetron or carrier frequency produces an output signal from the AFC circuit 19 that includes both the desired local oscillator frequency, which in this illustration is the carrier frequency plus the intermediate-frequency and an image frequency which is the carrier frequency minus the intermediate-frequency. The AFC circuit 19 which may be of any type is described here as a discriminator circuit, the output of which is a pulse whose amplitude and polarity are determined by the frequency of the intermediate-frequency pulse applied to it. This output pulse is converted by D.C. amplifier and sweep generator circuit 21 by means of suitable rectifying and integrating means to a suitable signal for controlling the frequency of local oscillator 15. The polarity of the control voltage is arranged to correct the frequency of local oscillator 15 towards the desired frequency which, in this case, is the frequency of the magnetron plus the intermediate-frequency. If for any reason no control voltage appears in the output of reference 21, the frequency of the local oscillator 15 is caused to sweep in a sawtooth fashion over the frequency range illustrated in Fig. 2. Curves 22 and 23 in Fig. 3 represent the frequency output of the discriminator circuit located in AFC circuit 19 showing the local oscillator image frequency curve 23 and the desired frequency curve 22. For purposes of illustration, it has been assumed that a negative voltage applied to the input of D.C. amplifier and sweep generator 21 will drive local oscillator 15 to a higher frequency and conversely for a positively applied voltage. It can be seen, therefore, that with proper AFC operation stabilization of the local oscillator will occur within the region designated P and R on curve 22 since in this region a decrease in local oscillator frequency will cause the control voltage to become more negative, which, in turn, will increase the local oscillator frequency and so tend to restore the status quo. An increase in local oscillator frequency, for example, within this region will also be corrected since a positive output will cause the local oscillator frequency to decrease. By considering now the possibility of operation within the image intermediate-frequency, which is that frequency below the magnetron frequency illustrated as curve 23, it will be observed that lock within the limits of T and U is impossible since the negative output would cause the local oscillator to increase in frequency, thereby preventing stabilization and similarly a positive output would cause the local oscillator to decrease in value, thereby again preventing lock of the local oscillator designated as the carrier frequency less intermediate-frequency. This same analysis indicates that it is impossible, therefore, for stabilization to occur in the regions between S and T on curve 23.

In order to stop the search and stabilize the local oscillator, a small negative control voltage is required which results from the fact that the search drives the local oscillator frequency from high to low. For systems that sweep from low to high, a small positive voltage would be needed. Due to the need for this small negative sweep-stopping voltage, the regions of possible stabilization are limited to between P and R on curve 22 and between U and V on the image curve 23. In actual practice, it has been found that lock occurs at point X instead of Q on curve 22 and at point Y on curve 23. The gain of the AFC loop will determine how close the actual lock-on points defined as point X on curve 22 and point Y on curve 23 will be to the horizontal axis. Stabilization or locking-in at point X at curve 22 represents the desirable state of affairs with the local oscillator held at the correct frequency, which is the carrier frequency plus the intermediate-frequency. Locking at point Y on curve 23 represents an undesirable state with the local oscillator frequency held near the image frequency, which is the carrier frequency minus the intermediate-frequency. It can be seen, therefore, that the distance on curve 23 between the actual possible lock, which is Y, and the image frequency defined as the carrier frequency minus the intermediate-frequency is displaced a distance D in frequency that is based on the response characteristic of the discriminator used in the AFC circuit. The output of the anti-image circuit, as shown by curves 24 and 25, is arranged to permit lock at point X which is the desired intermediate-frequency while at the same time preventing lock at point Y on the undesired curve 23.

The disclosed anti-image circuit described herein makes use of the fact that at X the intermediate-frequency is very close to the nominal value, while at Y the frequency differs appreciably from the intermediate-frequency since it is less by the amount designated as D. It can be seen, therefore, that an anti-image circuit constructed in the form of a filter designed to pass frequencies in the region of the intermediate-frequency minus D, but not frequencies in the region of the intermediate-frequency would have its input triggered by the AFC mixer 18, and that any pulse passing through the anti-image circuit would recycle the local oscillator. In scanning, the local oscillator begins sweeping in frequency above the magnetron plus the intermediate-frequency and as the local oscillator sweeps from high to low, lock will take place at the point X, which is on the desired curve 22. In the anti-image circuit just described, a unidirectional device, such as a suitable diode, would eliminate all positive-going pulses and feed only negative signals into the D.C. amplifier and sweep generator circuit 21 for recycling the local oscillator 15. The positive outputs of anti-image circuit 20 have no effect on the system. The effect, therefore, is to cause any negative output signal from the anti-image circuit to recycle local oscillator 15 from the high to low frequencies. In reviewing the operation of this circuit, it should be borne in mind that the polarities mentioned are not absolute values but are related to the circuit to be herein described and are based on the direction in which the local oscillator frequency sweeps. A practical and convenient form of filter for the anti-image circuit is a second discriminator having its cross-over frequency lower than the intermediate-frequency and having a characteristic similar to that shown by curves 24 and 25. The output of the anti-image discriminator will consist, therefore, of both positive and negative pulses, and by arranging the output to pass through a suitable diode, only negative pulses will affect the retriggering of the local oscillator. In this way, the local oscillator is prevented from locking-in at Y, but not from locking-in at X.

Figure 4:
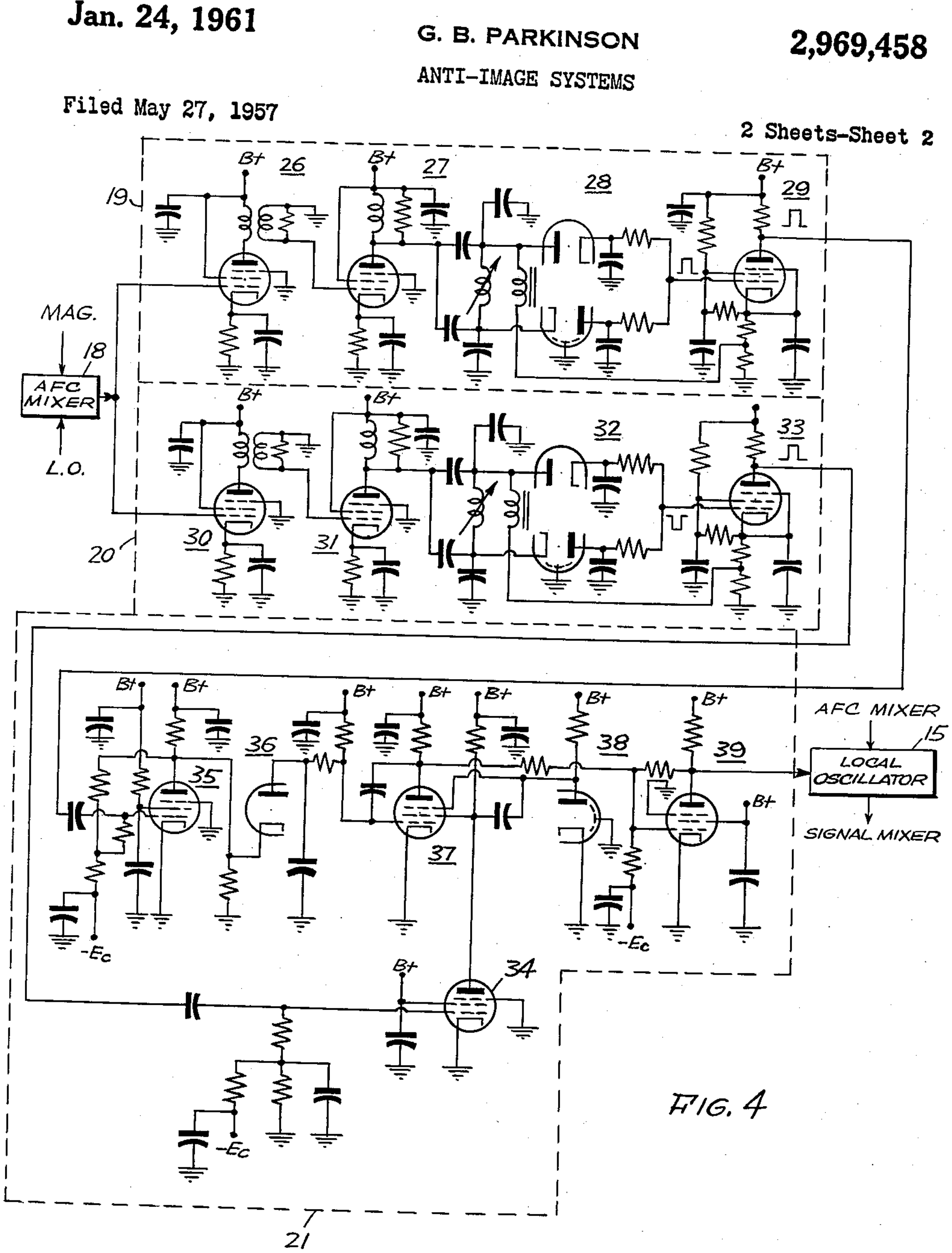
Fig. 4 is a schematic diagram of a suitable anti-image and AFC system built according to the teachings of this invention.

Referring now to Fig. 4, there is shown a schematic diagram built according to the teachings of this invention for preventing lock on the image or undesired intermediate-frequency. The output of AFC mixer 18 is fed to the input of AFC stage 19 and the anti-image circuit 20.

The AFC circuit 19 consists of conventional two-stage 60 megacycle intermediate-frequency amplifiers 26 and 27 feeding a 60 megacycle discriminator 28, which, in turn, feeds a video amplifier 29. The AFC anti-image circuit 20 similarly consists of two-stage 55 megacycle intermediate-frequency amplifiers 30 and 31 driving a 55 megacycle discriminator 32, which, in turn, feeds a video amplifying stage 33. The overall bandwidths of both the AFC system 19 and the AFC anti-image circuit 20 are preferably the same, thereby making both circuits the same in all respects except that the AFC anti-image circuit 20 is tuned to a lower frequency than the desired intermediate-frequency which in this embodiment was chosen to be 55 megacycles as opposed to the intermediate-frequency of 60 megacycles. The RF signals from the AFC mixer 18 are fed to the input circuits of both the 60 megacycle AFC circuit 19 and the 55 megacycle AFC anti-image circuit 20. Incoming RF signals within the frequency range of the 60 megacycle circuit and the AFC circuit 19 are amplified by stages 26 and 27 and frequency detected by discriminator 28, which is actually a modified form of a Foster-Seeley type discriminator, operating on the phase difference between coupled tuned circuits as described in the Proceedings of the Institute of Radio Engineers (1937), vol 25, page 289. The signal from discriminator circuit 28 is amplified by video amplifying stage 29, the output of which feeds D.C. amplifier and sweep generator 21. Incoming RF signals within the frequency range of the 55 megacycle circuit of the AFC anti-image circuit 20 are treated in a similar manner. The output signal from amplifying stage 33 of the AFC anti-image circuit 20 is similarly fed to D.C. amplifier and sweep generator 21. The output signal from stage 33 of the AFC anti-image circuit 20 is fed to the grid of trigger tube 34 in order to produce a voltage for initiating a recycling of the local oscillator 15. Due to the large negative bias designated as $-E_c$ on the grid of trigger tube 34, only positive pulses from the anti-image circuit 20 will maintain tube 34 in a conductive state which in this illustration is the normal state. The circuit is so arranged that a negative pulse fed into trigger tube 34 will cut off the normal conduction of said tube, thereby disrupting the associated phantastron circuits that said tube feeds into. The effect, therefore, is that a negative pulse from the AFC anti-image circuit 20 will cause a new sweeping action of local oscillator 15.

The output signal from stage 29 of the AFC circuit 19 is fed to the input of stage 21 which is a pulse amplifier stage 35. Due to the large negative bias on the grid of said stage 35, only positive video pulses emanating from stage 29 will be amplified by pulse amplifier stage 35. It can be seen therefore, that only signals produced from the negative half of the 60 megacycle discriminator 28 in AFC circuit 19 will be amplified, since a negative signal output from discriminator stage 28 becomes a positive pulse in the output of amplifying stage 29 which is then fed to amplifying stage 35. By referring also to Fig. 3, it can be seen that when the AFC system locks, the 60 megacycle discriminator in stage 28 will produce negative pulses that vary in amplitude according to the different frequency variations of the local oscillator and transmitter frequency, and it is these pulses that are amplified as positive input pulses in stage 35. The output of amplifying stage 35 is fed to a pulse-charging diode circuit 36 that has the effect of only passing negative pulses appearing in the output of stage 35. The output of pulse-charging diode 36 feeds a phantastron search and control circuit 37 that operates either as a D.C. control circuit or as a sawtooth generator. The output of the phantastron circuit 37 is fed to a D.C. clamping stage 38 that limits the output excursion of the sweeping voltage and then to a D.C. amplifier and inverter tube stage 39 from where the output signal is connected to local oscillator stage 15. If for any reason during the sweeping of the phantastron circuit 37, an anti-image pulse should appear at any part of the cycle, trigger tube 34 which is normally cut off will conduct, thereby momentarily biasing the phantastron circuit to cut off and causing a recycling of the sweep voltage fed to local oscillator 15.

When the sweep circuit 37 is triggered by signals from the anti-image circuit, the local oscillator 15 is rapidly tuned above the transmitter frequency and then tuned at a relatively slow rate downward from a high to low value for sweeping the local oscillator frequency. When the local oscillator reaches a frequency below the transmitter frequency, the searching operation will continue until tuning of the local oscillator results in the development of an AFC signal output from the AFC circuit 19, which in this case is the 60 megacycle circuit. With an output from the 60 megacycle circuit, an AFC voltage is produced that stops the search and takes over the local oscillator tuning as previously described. If the local oscillator is tuned by the search voltage into the image frequency region, which would be 60 megacycles below the transmitter frequency, the positive output will continue to sweep away from the image while the negative output will tend to cause a false lock. However, since both the 55 megacycle anti-image circuit and the 60 megacycle AFC circuits are aligned so that the anti-image circuit produces output when the AFC circuit produces output in the frequency region of the AFC discriminator, the sweep circuit is retriggered by the negative output signals from the anti-image 55 megacycle signal whenever the local oscillator is tuned into the image frequency region, thereby making it impossible to lock the AFC system with the local oscillator tuned to the image frequency.

This completes the description of the embodiments of the invention as disclosed herein. However, it should be understood that a suitable filter or discriminator anti-image device tuned to a frequency higher than the desired intermediate-frequency would also work if the sweeping of the local oscillator frequency were made from low to high. Accordingly, this invention should not be limited to the details of the embodiments as described herein except as defined by the appended claims.

What is claimed is:

1. In a system for preventing an automatic frequency control system from locking on the image frequency of a desired intermediate frequency, the apparatus comprising a signal source, a local oscillator, a mixer connected to the outputs of said source and said local oscillator for producing intermediate frequency signals, a sweep generator connected between said mixer and said local oscillator for causing said local oscillator to be tuned over a range of frequencies upon loss of said intermediate frequency signals, an automatic frequency control circuit continuously coupled to said local oscillator and said mixer for causing said local oscillator to be locked in frequency when said intermediate frequency signals are present, and an anti-image circuit coupled between said mixer and said sweep generator for delivering a triggering pulse to actuate said sweep generator when said intermediate frequency signals are in the vicinity of the image frequency, said anti-image circuit including a discriminator tuned to a frequency different from the desired intermediate frequency to provide an output which may have either one of two electrical polarities, and further including means responsive to an output of one polarity only for producing said triggering pulse.

2. In a system for preventing an automatic frequency control system from locking on the image frequency of a desired intermediate frequency, the apparatus comprising a source of high frequency signals, a local oscillator, a mixer connected to the outputs of said source and said local oscillator for producing intermediate frequency signals, an automatic frequency control circuit continuously coupled between said mixer and said local oscillator to cause said local oscillator to be locked in frequency when intermediate frequency signals are present, a sweep generator coupled to said local oscillator for causing said local oscillator to be tuned over a range of frequencies upon loss of intermediate frequency signals, and an anti-image circuit coupled between said mixer and said sweep generator for actuating said sweep generator to prevent locking at said image frequency, said anti-image circuit including a discriminator tuned to a frequency close to but different from said desired intermediate frequency, said discriminator providing an output which may have either a negative or positive electrical polarity, and said anti-image circuit further including means coupled to said discriminator and responsive to an output of one polarity only for producing a signal to actuate said sweep generator.

3. Apparatus for automatically maintaining a substantially fixed frequency difference between a high frequency signal source and a frequency controllable local oscillator comprising a mixer connected to the outputs of said source and said local oscillator, a first discriminator continuously coupled to said local oscillator for providing an output whose amplitude and electrical polarity are dependent upon the frequency deviation from a first fixed frequency of signals derived from said mixer, a sweep generator coupled to said first discriminator and said local oscillator for causing said local oscillator to be tuned over a range of frequencies in the absence of an output from said first discriminator, a second discriminator coupled to said mixer and having an output whose electrical polarity is dependent upon the frequency deviation of signals derived from said mixer from a second fixed frequency adjacent to but different from said first fixed frequency, a trigger tube coupled between said second discriminator and said sweep generator, and means for causing said trigger tube to actuate said sweep generator in response to signals of one polarity only from said second discriminator.

References Cited in the file of this patent

UNITED STATES PATENTS 2,434,294 Ginzton ---------------- Jan. 13, 1948

2,647,994 Weiss ------------------ Aug. 4, 1953